Nov. 22, 1932.  J. L. HECHT  1,888,627
TRACTION WHEEL
Filed Sept. 18, 1930
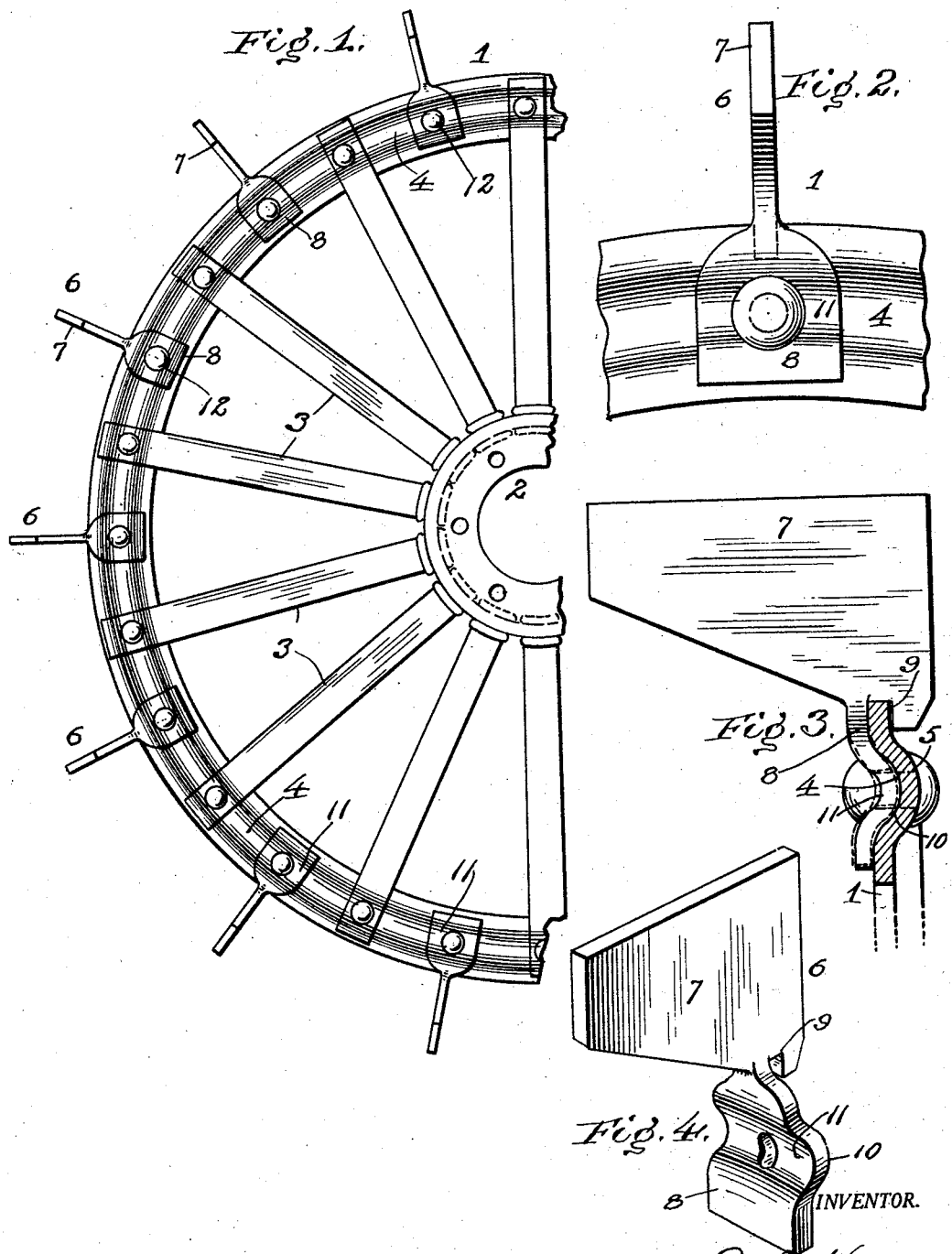

Patented Nov. 22, 1932

1,888,627

UNITED STATES PATENT OFFICE

JOSEPH L. HECHT, OF DAVENPORT, IOWA, ASSIGNOR TO FRENCH & HECHT, INCORPORATED, A CORPORATION OF IOWA

TRACTION WHEEL

Application filed September 18, 1930. Serial No. 482,709.

This invention relates to traction wheels, and has for its object the production of a wheel of light, strong, and durable construction, and in which the traction cleats will be very firmly fastened to the rim of the wheel without danger of looseness or displacement under the severe stresses to which such cleats are subjected in the practical operation of the wheel.

With these and other objects in view, the invention consists of the improved construction and arrangement of parts, which will be described in detail in the specification to follow, the novel features of which will be set forth in the appended claims.

In the accompanying drawing:—

Fig. 1 is a side elevation of a portion of a traction wheel having my invention embodied therein;

Fig. 2 is a side elevation on an enlarged scale of a portion of the rim of the wheel, and a traction cleat applied thereto;

Fig. 3 is a vertical sectional elevation of the same; and

Fig. 4 is a perspective view of one of the traction cleats detached.

Referring to the drawing:—

The type of wheel shown by way of example as embodying the invention, comprises a rim member 1 in the form of an annular plate presented edgewise to the ground, a hub 2, and spokes 3 connected at their ends respectively with the hub and rim. This rim, in order to strengthen and reinforce it, is formed with a circumferential corrugation, presenting a circumferential groove 4 in one side, and a corresponding rib 5 on the other side; and this groove, is, in accordance with the invention, utilized to furnish seats for traction cleat elements 6, which are applied at intervals around the rim, as shown best in Fig. 1.

The traction cleat elements consist each, as shown in Fig. 4, of a traction cleat proper, in the form of a plate 7, and an integrally connected bracket portion 8 extending inwardly from the inner edge of the plate near one end thereof, and disposed in a plane at right angles to the plane of the plate, so that when the bracket is fastened to the side of the rim, in the manner presently to be described, the cleat proper or plate 7 will extend transversely of the rim, so as to act with the usual tractive effect.

To adapt the cleat elements to be firmly and rigidly fastened to the rim, the plate 7 is provided in its inner edge at one side of the bracket 8, with a notch or recess 9 of a form which will receive and seat around the outer edge of the rim plate 1; and the bracket 8 is formed with a circumferential corrugation, presenting at one side a rib 10 to seat in the groove 4 in the rim plate, and on the other side a corresponding groove 11, which grooved and ribbed portions of the brackets and rim are formed with rivet holes extending transversely therethrough to receive fastening rivets 12, by which the traction cleat elements are secured to the rim.

From the foregoing description, it will be understood that the groove in the rim serves as sockets or seats for the bracket portions of the traction cleat elements, the ribs or protuberant portions of said brackets extending into said groove in the rim, while the outer edge of the rim extends into the notches in the plates 7, whereby an interlocking engagement of the traction cleat elements with the wheel rim is secured.

The form and contour of the interfitting rib and groove of the bracket and rim, in relation to the notch in the plate 7, are such in respect to the shape of the contacting faces that when the bracket is fastened to its seat on the rim by the heading down of the fastening rivets, the traction cleat element will be drawn inwardly slightly, which action will seat the plate 7 tightly and firmly against the outer edge of the rim, and the parts will be held in their interlocked relations, very solidly and securely, and without danger of becoming loose or displaced, it being noted on reference to Fig. 3, that there is a slight clearance between the wall of the notch 9 and the side face of the rim, which clearance will permit of the slight inward movement of the cleat in the final fastening of the same to its seat. The corresponding contours of the bracket 8 and the grooved side of the rim plate are so drawn, that when forced into place without tightening them by holding bolts or rivets, there will be a slight divergence between them, starting from the peripheral seat portion and increasing in the direction toward the hub, just enough to be able to forcibly spring the bracket over the wheel rim, as indicated by the dotted line in Fig. 3. When the rivets are driven in, the corrugated part of the bracket is forced into seat 4, laterally as well as slightly radially, partly through the draft on the rivet hole toward the hub, until the bottom of the recess 9 tightly abuts the peripheral edge of the annular plate 1.

It will be understood, that, in so far as the seating of the ribbed brackets in a groove in the rim is concerned, it is not necessary that the groove in the rim be a continuous one, since all of the advantages of the firm connection of the traction cleat elements could be realized if the groove in the rim were made discontinuous, or at intervals corresponding to the location of the cleats. Therefore, such a change of the detailed form and arrangement of the parts is comprised within the limits of the invention; and it will be understood that other and various changes such as would suggest themselves to the skilled mechanic, may be made without departing from the limits of the invention; and further, that the invention is not limited to any particular form or construction of the parts, except in so far as such limitations are specified in the claims.

Having thus described my invention, what I claim is:—

1. In a traction wheel, the combination of a rim, traction cleats applied thereto and consisting each of a bracket portion seated against one side of the rim, and a connected cleat portion seated against the outer peripheral edge of the rim, and means for fastening the bracket portions to the rim, the contacting surfaces of said bracket portions and rim being of such relative form that when drawn together in the fastening operation, the cleat will be forced simultaneously in a radial as well as a lateral direction into firm contact with the rim.

2. In a traction wheel, the combination with a rim formed with a curved seat for the attachment of traction cleats, of traction cleats comprising each a bracket formed with a curved protuberant portion adapted to extend in the seat on the rim, and a connected cleat portion proper provided with a recess to receive the peripheral edge of the rim, and means for fastening the protuberant portions of the brackets in the seat in the rim, the contacting faces of said seat and protuberant portions being of such relative form that in the operation of fastening the parts together, the cleats will be drawn radially inwardly against the peripheral edge of the rim and the latter will be seated in the recesses therein.

3. In a traction wheel, the combination of a rim comprising an annular plate presented edgewise to the ground and provided with a circumferential strengthening rib on one side, and a corresponding groove in the other side to serve as a seat for traction cleats, traction cleats, each comprising a cleat proper formed in its inner edge with a recess to receive the outer edge of the rim, and a connected bracket portion, said bracket portions of the several cleats being formed on one side with ribs seated respectively in the groove in the rim, and rivets extending through the rim and bracket portions of the cleats to hold the brackets to their seats, with the outer edge of the rim extending in said recesses in the cleats proper.

4. In a traction wheel, the combination of a rim comprising an annular plate presented edgewise to the ground and provided with a circumferential strengthening rib on one side, and a corresponding groove in the other side to serve as a seat for traction cleats, traction cleats, each comprising a cleat proper and a connected bracket portion, said bracket portions of the several cleats being formed on one side with ribs seated respectively in the groove, and rivets extending through the rim and bracket portions of the cleats to hold the brackets to their seats.

In testimony whereof, this specification has been duly signed by:

JOSEPH L. HECHT.